United States Patent
Cammas et al.

(10) Patent No.: US 8,827,208 B2
(45) Date of Patent: Sep. 9, 2014

(54) SMOKE GENERATION DEVICE FOR AIRCRAFT AND AIRCRAFT FITTED WITH SUCH A DEVICE

(75) Inventors: Jean Cammas, Toulouse (FR); Audrey Camps, Foix (FR)

(73) Assignee: Airbus, Blagnac (FR)

( * ) Notice: Subject to any disclaimer, the term of this patent is extended or adjusted under 35 U.S.C. 154(b) by 430 days.

(21) Appl. No.: 12/209,512

(22) Filed: Sep. 12, 2008

(65) Prior Publication Data

US 2009/0072095 A1    Mar. 19, 2009

(30) Foreign Application Priority Data

Sep. 14, 2007    (FR) ..................................... 07 57606

(51) Int. Cl.
*B64D 1/00* (2006.01)
(52) U.S. Cl.
USPC ......................................................... 244/136
(58) Field of Classification Search
CPC ..................................... B64D 1/16; F02K 3/10
USPC .......... 244/1 TD, 53 R, 73 R, 74, 136, 135 R, 244/135 B
See application file for complete search history.

(56) References Cited

U.S. PATENT DOCUMENTS

| | | | | |
|---|---|---|---|---|
| 2,250,762 A * | 7/1941 | Haberlin | ........................ | 244/136 |
| 2,476,171 A * | 7/1949 | Williams, Jr. | .................. | 244/136 |
| 2,665,092 A * | 1/1954 | Sands | ........................... | 244/136 |
| 3,128,598 A * | 4/1964 | Gordon | ....................... | 60/39.281 |
| 3,278,141 A * | 10/1966 | Wolcott | ........................ | 244/136 |
| 5,384,802 A * | 1/1995 | Bushman | ........................ | 372/89 |
| 5,549,259 A * | 8/1996 | Herlik | ........................... | 244/136 |
| 5,573,206 A * | 11/1996 | Ward | ......................... | 244/135 A |
| 5,665,272 A * | 9/1997 | Adams et al. | ...................... | 516/5 |
| RE38,686 E * | 1/2005 | Loblick | .......................... | 392/397 |
| 7,017,862 B1 * | 3/2006 | Fischbach | .................. | 244/199.3 |
| 7,093,798 B2 * | 8/2006 | Whelan et al. | ................. | 244/120 |
| 7,134,271 B2 * | 11/2006 | Baughman et al. | ........... | 60/226.1 |
| 7,287,383 B2 * | 10/2007 | Bunel et al. | ..................... | 60/762 |
| 7,334,389 B1 * | 2/2008 | Allen | .......................... | 60/39.094 |
| 2003/0218098 A1 * | 11/2003 | Goto et al. | .................. | 244/135 R |
| 2009/0050747 A1 * | 2/2009 | Troutman | ...................... | 244/190 |

FOREIGN PATENT DOCUMENTS

| | | | | |
|---|---|---|---|---|
| DE | 20 2004 018 021 U1 | 2/2005 | | |
| DE | 202004018021 U1 * | 2/2005 | .............. | B64D 1/20 |
| FR | 2 795 045 A1 | 12/2000 | | |
| FR | 2795045 A1 * | 12/2000 | ............ | B64D 47/08 |
| GB | 2 082 519 A | 3/1982 | | |
| WO | WO 2006/096918 A1 | 9/2006 | | |

* cited by examiner

*Primary Examiner* — Tien Dinh
*Assistant Examiner* — Keith L Dixon
(74) *Attorney, Agent, or Firm* — Oblon, Spivak, McClelland, Maier & Neustadt, L.L.P.

(57) ABSTRACT

A smoke generation device for an aircraft which enables viewing of wake vortices of an aircraft over a variable distance without modifying the aircraft flight domain. This is achieved by placing a part of the smoke generation device inside the aircraft and using a liquid flow regulator.

15 Claims, 5 Drawing Sheets

SMOKE GENERATION DEVICE FOR AIRCRAFT AND AIRCRAFT FITTED WITH SUCH A DEVICE

TECHNICAL DOMAIN

The invention relates to a device for generation of smoke for an aircraft designed to view aircraft wake vortices.

The invention also relates to an aircraft comprising a smoke generation device according to the invention.

STATE OF PRIOR ART

In general, displacement of an aircraft in flight creates a pair of intense wake vortices. The longitudinal axis of each vortex is approximately parallel to the displacement direction of the aircraft. This pair of vortices is the result of air passing around the various ends of the wing assembly, mainly at the tips of wings but also at the tips of flaps and ailerons.

These wake vortices are particularly dangerous for other air traffic users, particularly during landing and takeoff phases. An aircraft that passes through these vortices can be affected by an intense sudden roll that can destabilise it.

Furthermore, the intensity of these wake vortices is usually proportional to the weight of the aircraft. Minimum horizontal distances between two aircrafts are imposed for safety reasons, depending on the weight category of each aircraft. Thus, the safety distance necessarily increases with the weight of the preceding aircraft. It is in the order of a few nautical miles. It is essential to be able to characterise the distance at which wake vortices dissipate, to optimise airport traffic while guaranteeing flight safety, for new aircraft and particularly for large aircraft. It also provides the means of defining legal horizontal distances between two aircrafts.

One method of studying wake vortices consists of viewing them by means of smoke generated by a device fixed to the aircraft. Several devices exist for various applications.

Thus, document WO2006/096918 discloses a device for generation of smoke for an aircraft to write messages in the sky. The device is in the form of a tube fixed to the aircraft fuselage or wing assembly and oriented in the aircraft displacement direction. The tube has an air inlet at the forward end and an outlet at its aft end. When the device is in operation, surrounding air enters the tube through the air inlet and is then heated by a burner. The hot air then enters a helical screw shaped deflector. A pipe end piece ejects a liquid perpendicularly to the axis of the hot air flow, at the deflector inlet and within the hot air flow. Liquid is entrained by the hot air flow and is sprayed and vaporised to form smoke. The smoke produced is then evacuated from the device through its aft outlet.

Another technique is used particularly by aircraft for aerobatics fitted with turbojets. For example as described in the www.patrouilledefrance.com Internet site, a pod containing a liquid tank and means of distributing liquid is fixed under the aircraft fuselage. The liquid is transferred through a pipe to the outlet of the turbojet into the zone of the hot gas flow. Liquid is then injected so as to form the required smoke.

Use of the smoke generation device to study wake vortices of a new aircraft must not modify the aircraft flight domain. But some parts of devices used for the smoke generation techniques mentioned above are fixed to the outside of the aircraft, for example under the fuselage or under the wing assembly. Consequently, the flight domain is modified and its characteristics will not be the same as the flight domain of the same aircraft not equipped with such a device.

It is also essential to be able to view wake vortices over a variable distance so as to characterise the intensity of vortices as a function of the distance to the aircraft. But there is no means of controlling the quantity of smoke produced with these devices, and therefore the smoke length.

PRESENTATION OF THE INVENTION

Therefore, the purpose of the invention is to propose a device for generation of smoke for an aircraft that overcomes the disadvantages mentioned above related to embodiments according to prior art, and also to present an aircraft fitted with such a device.

According to the invention, the result is obtained by means of a smoke generation device for an aircraft comprising at least one turbojet with a hot gas flow zone, the device comprising a tank containing a smoke generating liquid, means of distributing the liquid connected to the tank, means of injecting the liquid connected to the liquid distribution means, and control means located inside the aircraft and used to control said distribution means, characterised in that said tank and said distribution means are arranged inside the aircraft and that said distribution means comprise means of regulating the liquid flow.

Preferably, the injection means are adapted to spray the liquid. The liquid thus sprayed is in the form of fine droplets, which can give a particularly high combustion efficiency. Small droplets are more easily vaporised during combustion. The high combustion efficiency also makes it possible to generate more smoke. The length of smoke available to view aircraft wake vortices depends on the quantity of smoke produced.

Preferably, the injection means are oriented so that the liquid is injected in the direction of the turbojet hot gas flow, which can give high combustion efficiency because the hot gas flow is the hottest outlet flows from the turbojet.

Advantageously, the turbojet being supported by a mounting pylon fitted with an aft fairing adjacent to the zone of the hot gas flow of the turbojet, the injection means are connected to a part of the liquid conveyance means fixed to the aft fairing of the mounting pylon. This location of the injection means is in a hot gas flow zone that is not immediately disturbed by the cold gas flow. Therefore the temperature is not only high but it is also uniform. Thus, combustion of the sprayed liquid is optimum.

Advantageously, the liquid injection means comprise a plurality of injectors, each of which can be closed by closing means. The use of injector closing means provides means of controlling the number of active injectors and thus controlling the injected liquid flow. The injected liquid flow control can optimise liquid combustion and thus the quantity of smoke produced.

Preferably, the distribution means comprise means of purging the liquid present in said conveyance means, so that the conveyance means can be cleaned and therefore the device can operate more efficiently.

Advantageously, the device comprises means of visual observation connected to the control means and arranged so as to be able to monitor the injection means. These visual observation means provide a means of monitoring liquid combustion and thus optimising the liquid flow accordingly.

Preferably, the device comprises a removable assembly comprising said tank, said distribution means and said control means. The device also comprises a non-removable assembly comprising means of conveying the liquid connecting said distribution means to said injection means.

The invention also relates to an aircraft comprising a smoke generation device with the characteristics that have just been defined.

Other advantages and characteristics of the invention will be given in the non-limitative detailed description given below.

BRIEF DESCRIPTION OF THE DRAWINGS

We will now describe one embodiment of the invention as a non-limitative example, with reference to the appended drawings among which.

DETAILED PRESENTATION OF PARTICULAR EMBODIMENTS

Figure 1:
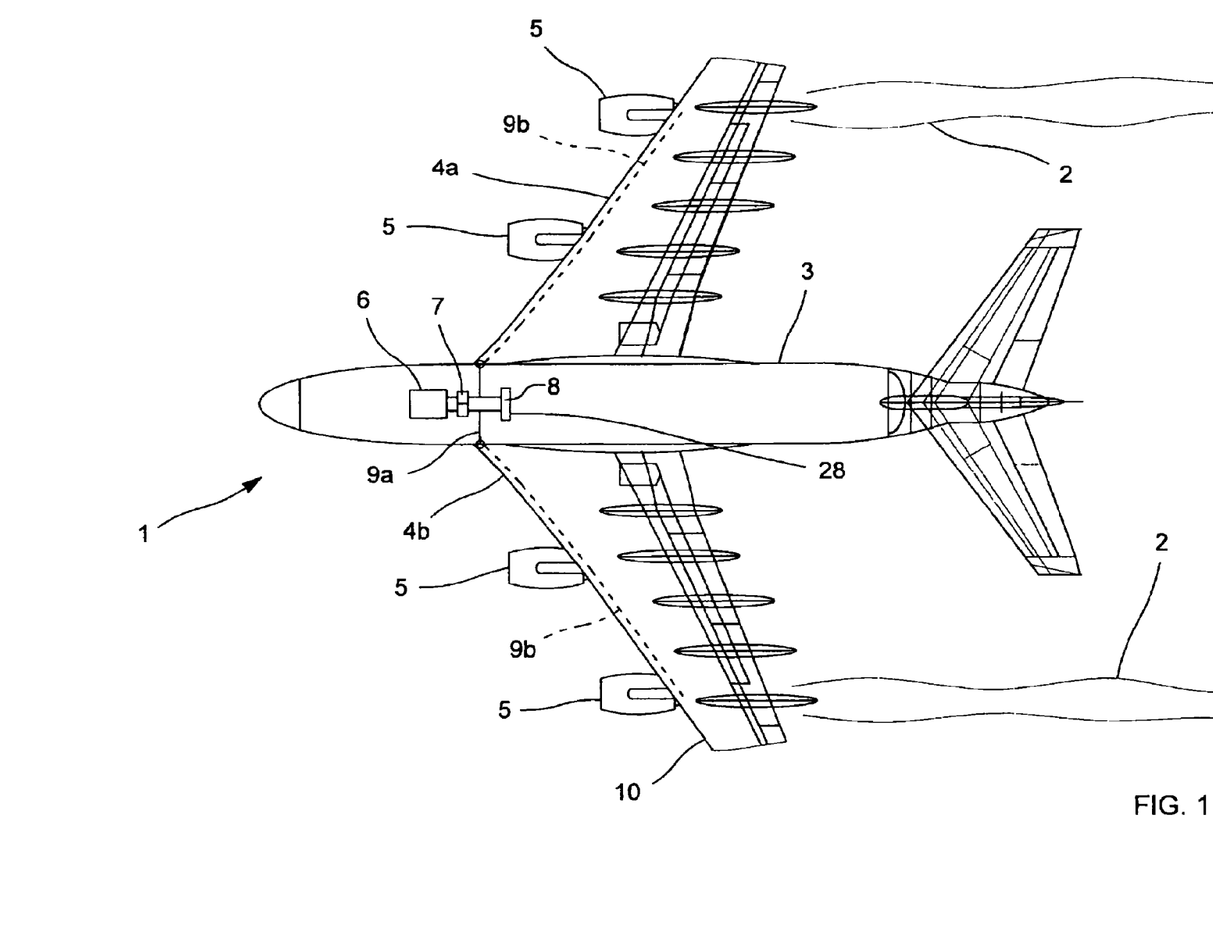
FIG. 1 is a top view diagrammatically showing an aircraft comprising a smoke generation device according to the invention.

With reference to FIG. 1, an aircraft 1 is equipped with a smoke generation device 2 according to one preferred embodiment of the invention. The aircraft comprises a fuselage 3, a wing assembly 4 (FIG. 6) comprising two wings 4a, 4b, at least one turbojet 5 with a hot gas flow zone 20 (FIGS. 2 and 3), and a mounting pylon 15 (FIG. 2) that connects the turbojet 5 and the wing assembly 4. Note that the smoke generation device according to the invention is designed to cooperate with a turbojet 5, but obviously it could also be a device designed to cooperate with any other type of turbojet with a hot gas flow zone 20.

According to one preferred embodiment of this invention, the smoke generation device comprises a tank 6 containing a smoke generating liquid arranged inside the aircraft 1, in the cabin or in the hold, and preferably in the hold. The tank 6 is connected to liquid distribution means 7 controlled by control means 8. The distribution means 7 and the control means 8 are located inside the aircraft 1. The distribution means 7 are placed in the immediate vicinity of the tank 6, while the control means 8 may be located in the hold or in the cabin.

Figure 2:
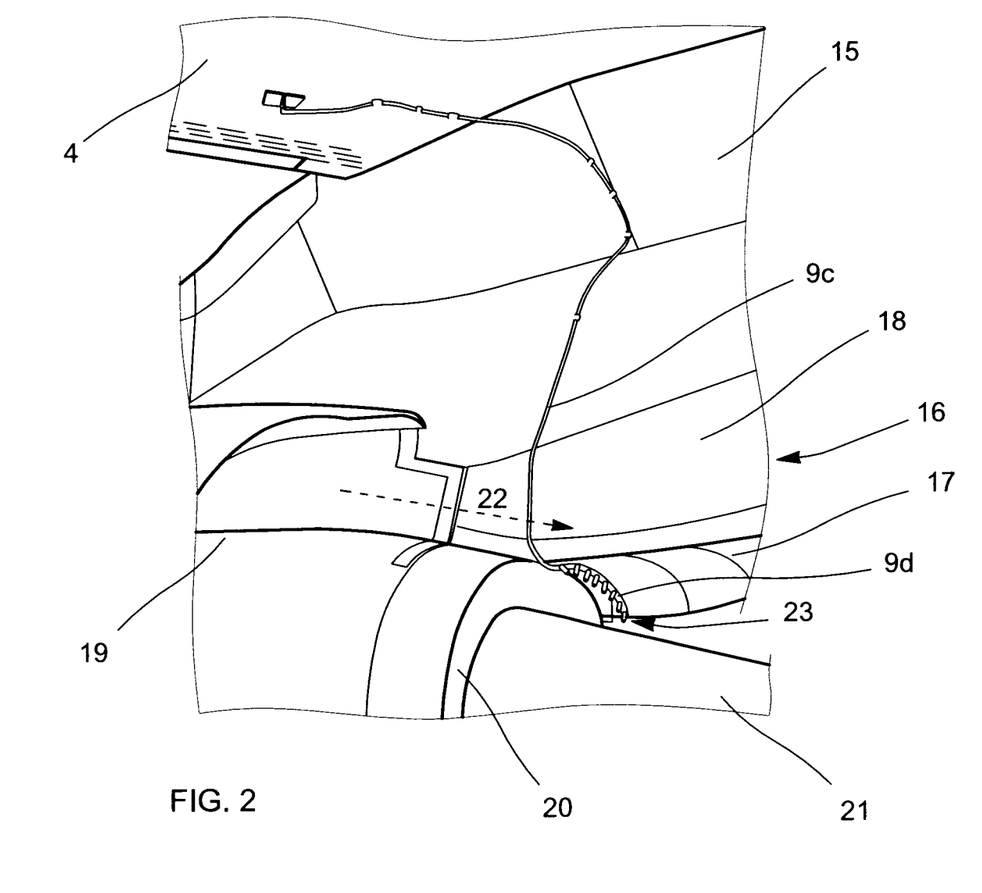
FIG. 2 is a perspective view of the aft part of a turbojet suspended from a mounting pylon on which a part of the conveyance means of the device according to the invention is fixed.

The liquid conveyance means 9 are connected to the distribution means 7 as far as the hot gas flow zone 20 of the turbojet 5 into which liquid is injected by injection means 23 (FIG. 2). In one embodiment of the invention, the conveyance means 9 comprise a plurality of pipes (9a, 9b, 9c, 9d) connected in series.

A first pipe 9a, preferably made from a flexible material, is connected to the liquid distribution means 7 and is located inside the aircraft 1 in the fuselage 3. It is connected through a leak tight bulkhead separating the fuselage 3 from the wing assembly 4, to a second pipe 9b located in the wing assembly 4, and preferably inside the leading edge 10 of the wing (4a, 4b).

The second pipe 9b, preferably made from a flexible material, is connected to a third pipe 9c (FIG. 2) fixed to the mounting pylon 15 and directed towards the lower panel 17 of the aft fairing 16 of the pylon.

The third pipe 9c is preferably placed outside the mounting pylon 15 but it may be fixed inside the mounting pylon 15. It is preferably made from a semi-rigid material with mechanical characteristics used to resist aerodynamic air flow forces and thermal effects due to the surrounding air. The third pipe 9c is connected to a fourth pipe 9d (FIG. 2) fixed to the lower panel 17 of the aft fairing 16 of the pylon, in the turbojet hot gas flow zone.

The fourth pipe 9d is preferably made from a rigid material that can resist the high temperatures of the hot gas flow, in other words several hundred degrees Celsius.

In one embodiment of the invention, the smoke generation device is designed to spray liquid into the hot gas flow zone 20 of at least one turbojet 5 of the aircraft, so as to generate smoke 2 in it due to the temperature of the environment.

Obviously, the smoke generation device according to the invention can cooperate with several of the aircraft's turbojets, without going outside the scope of the invention.

Thus in one preferred embodiment of the invention, the aircraft 1 comprising at least one pair of turbojets 5 arranged symmetrically about the axis of the fuselage 3, is fitted with a device according to the invention designed to cooperate with each of the turbojets 5 to generate smoke 2 on each side of the fuselage 3 in the hot gas flow zone 20 of the pair of turbojets 5. In this embodiment, it is advantageous if the device according to the invention comprises a single tank 6 containing the smoke generating liquid. On the other hand, liquid distribution means 7 and control means 8, and the conveyance means 9 and injection means 23 are specific to each turbojet and can operate independently.

FIG. 2 shows a perspective view of a lower part of the wing assembly 4 of the aircraft 1 to which a mounting pylon 15 is fixed, and a lateral part of this mounting pylon is shown. The suspension pylon makes the connection between the partially shown turbojet 5 and the wing assembly 4. In one preferred embodiment of the invention, the turbojet 5 comprises a cold gas flow zone 19 and a hot gas flow zone 20 in the aft part. These two zones 19 and 20 are partially shown in FIG. 2. The pylon 15 comprises an aft fairing 16. This fairing is located so that it is contiguous with the cold gas flow zone 19 and is positioned above the hot gas flow zone 20. Thus, the approximately vertical sides 18 of the aft fairing 16 are located approximately in the cold gas flow zone 19. The lower panel 17 of the aft fairing 16 is located above the hot gas flow zone 20. Much of this hot gas flow zone 20, located between the tail cone 21 of the turbojet 5 and the lower panel 17 of the aft fairing 16, carries the hot gas flow and therefore it is not a mixing zone between the hot gas flow and the cold gas flow.

Here and in the remainder of the description, the term "aft" refers to the flow direction of air through the turbojet 5, as represented by the arrow reference 22 in FIG. 2.

The third pipe 9c is connected to the second pipe 9b located inside the wing assembly 4 through a bulkhead located inside a panel in the wing assembly 4 and above the mounting pylon 15. The third pipe 9c is fixed to the mounting pylon 15 and passes towards the lower panel 17 of the aft fairing 16. A connector fixed to the mounting pylon 15, preferably to one of the vertical sides 18 of the aft fairing 16, in the cold gas flow zone 19, makes the connection between the third pipe 9c and the fourth pipe 9d fixed to the lower panel 17 of the aft fairing 16. Injection means 23 are fixed to the fourth pipe 9d and are oriented so as to inject the smoke generating liquid preferably into the hot gas flow, towards the tail cone 21 of the turbojet 5.

Figure 3:
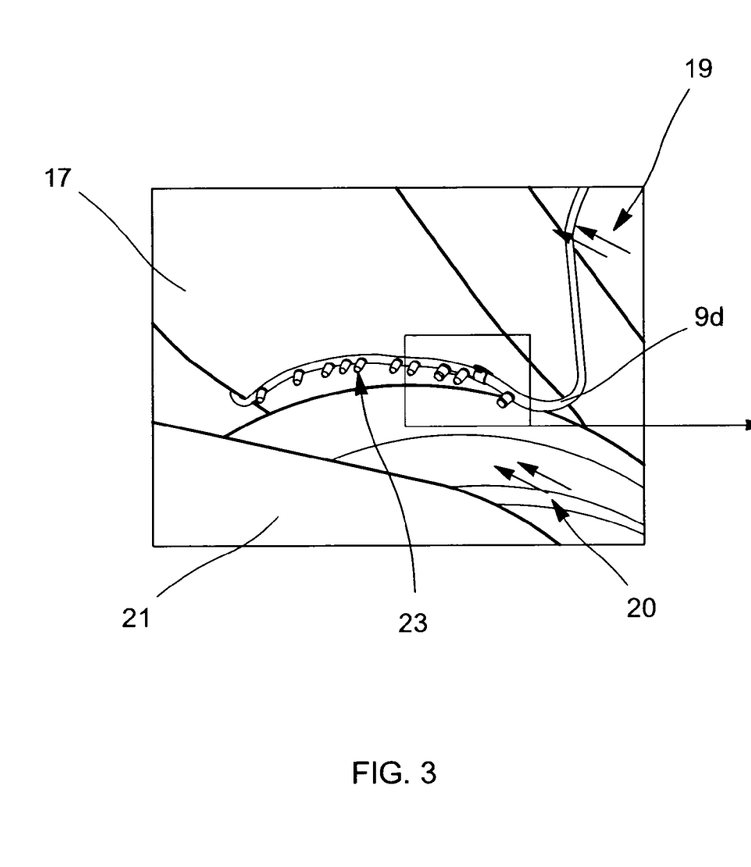
FIG. 3 is a perspective view of the aft fairing of the mounting pylon on which a part of the conveyance means of the device according to the invention is fixed.

FIG. 3 shows a view of the fourth pipe 9*d* fixed to the lower panel 17 of the aft fairing 16 and placed above the tail cone 21 of the turbojet 5, in the hot gas flow zone 20. The fourth pipe 9*d* is designed to follow the curvature of the lower panel 17 to minimize disturbances to the hot gas flow stream due to the presence of the pipe 9*d*. This position of the fourth pipe 9*d* has the advantage of being in a flow zone in which the flow is essentially the hot gas flow with little mixing with the cold gas flow. Therefore the temperature is high and uniform, which facilitates good combustion of the injected liquid. It is easy to make the attachment to the lower panel 17.

Figure 4:
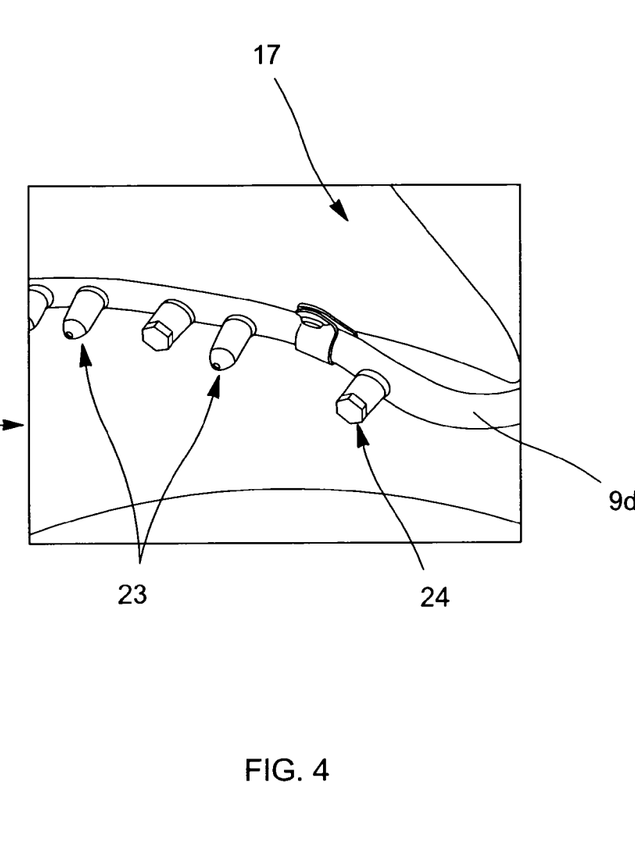
FIG. 4 is an enlarged partial view of a part of FIG. 3.

FIG. 4 shows an enlarged partial view of FIG. 3. It shows means 23 of injecting the smoke generating liquid fixed to the fourth pipe 9*d* and oriented towards the tail cone 21 of the turbojet 5, in other words toward the hot gas flow. The injection means 23 are conventionally designed injectors resistant to high temperatures, like those used particularly in domestic boilers. It is advantageous if a plurality of injectors 23 is used, preferably about ten, so as to reduce the liquid flow at ejection. Preferably, the injectors are capable of spraying liquid in the form of small droplets that are more easily vaporised during combustion. The combustion efficiency is then high, so that a larger quantity of smoke is produced. It is advantageous to be able to close the injectors 23 by closing means 24, for example plugs 24, to control the flow.

Figure 5:
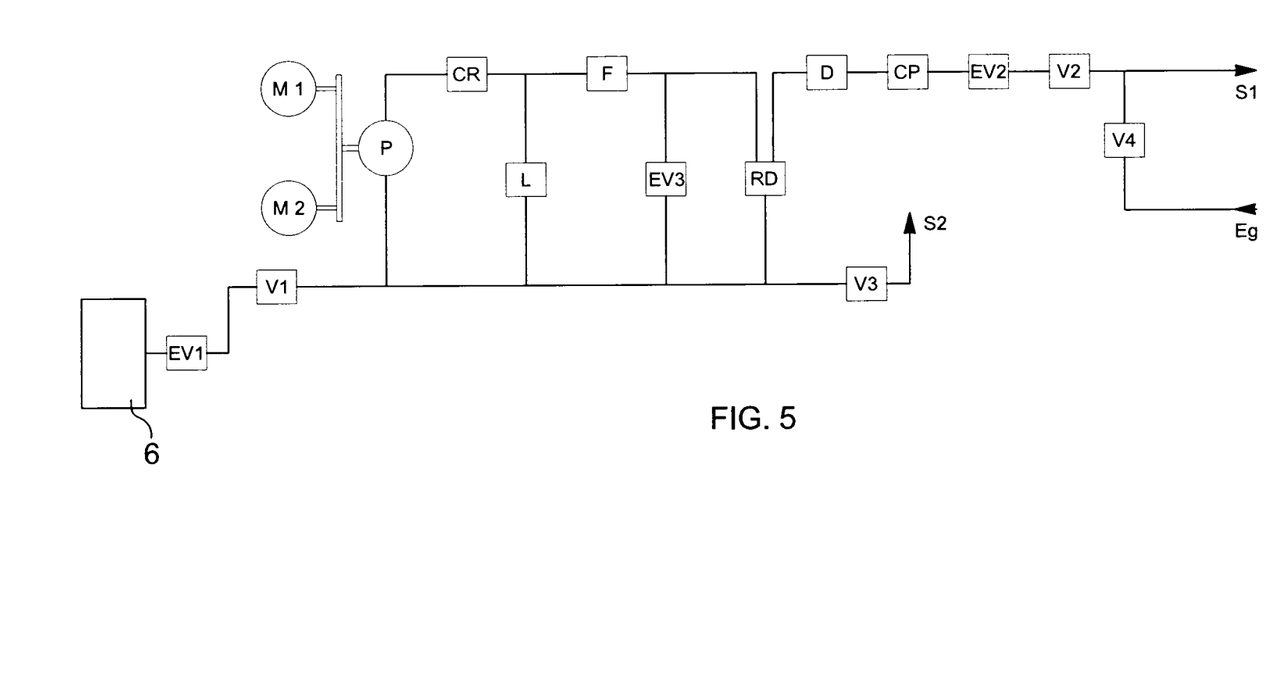
FIG. 5 is a diagrammatic principle view of the distribution means according to the invention.

FIG. 5 represents the principle diagram for the smoke generating liquid distribution means 7 located inside the aircraft 1. A pump P is connected to a liquid outlet from the tank 6 so as to guide the liquid in the pipework of the distribution means 7. The pump P is controlled by at least one motor M, and preferably two motors M1 and M2 so as to better control the pump flow P and to have a standby motor in the case of a failure. The outlet pipe S1 from the pump P is connected to liquid conveyance means 9, and particularly to the first pipe 9*a*.

Two solenoid valves EV1 and EV2 are arranged so as to control the opening and closing of the distribution means 7. The first solenoid valve EV1 called the entry solenoid valve is arranged in series between the tank 6 and the pump P. The second solenoid valve EV2 called the outlet solenoid valve is placed at the exit from the distribution means 7, so as to open or close the liquid access to the conveyance means 9.

A flow regulator RD is placed in series between the pump P and the outlet solenoid valve EV2 so as to control the liquid flow, and it has a second liquid inlet connected to the inlet of pump P. The flow regulator RD is capable of controlling the liquid flow when liquid is ejected through the injection means 23. The flow control can control the quantity of smoke 2 produced and therefore the length over which the wake vortices are displayed.

The distribution means 7 include surveillance means, particularly a flowmeter D and a pressure sensor CP arranged in series between the flow regulator RD and the outlet solenoid valve EV2, so as to monitor liquid flow conditions.

It is advantageous to make operation of the distribution means device 7 safe, by using safety means. The safety means include in particular two valves V1 and V2 that can be opened or closed manually and are arranged in series with the inlet solenoid valve EV1 and the outlet solenoid valve EV2 at the distribution means inlet and outlet. The safety means also include a non-return valve CR for liquid located at the outlet from said pump P, a pressure limiter L located at the outlet from the non-return valve CR and in parallel with said pump P so as to limit the pressure, for example to 20 bars, and a high pressure filter F arranged in series between the non-return valve CR and the flow regulator RD so as to prevent the circulation of particles with the liquid.

It is advantageous if the conveyance means 9 can be cleaned, to prevent uninjected liquid from becoming stagnant. This is done by providing the distribution means 7 with drain means. The drain means comprise a gas inlet pipe Eg, preferably nitrogen gas, connected to the outlet pipe S1 from the distribution means 7, between valve V2 and the first pipe 9*a*. A manual valve V4 is placed in the gas inlet pipe Eg.

A third solenoid valve EV3 called the priming solenoid valve is placed in parallel with pump P so as to redirect the liquid flow to the inlet of pump P when this valve is open, to create a loop hydraulic circuit including the pump P, so as to initiate liquid circulation in the distribution means 7 when the device according to the invention is started. A priming pipe S2 is arranged between the third solenoid valve EV3 and the inlet of pump P, so as to enable liquid to evacuate when the third solenoid valve EV3 is open. Opening and closing of the priming pipe S2 are controlled by a manual priming valve V3.

Control means 8 are used to control the distribution means 7. These control means 8 are advantageously grouped together in a control box 28 located in the cabin or in the hold. The control means 8 are used to monitor the hydraulic pressure by means of the pressure sensor CP, and the liquid flow by means of the flow meter D. Control means 8 are used to check the flow regulator RD, to control the solenoid valves EV1, EV2 and EV3, and to check that the pump P is activated by controlling the motors M1 and M2. The control box 28 may contain control means 8 necessary for several turbojets of the aircraft.

The smoke generating liquid is oil or gasoil, or any liquid that can generate smoke by combustion. In one embodiment of the invention, the liquid is oil.

Figure 6:
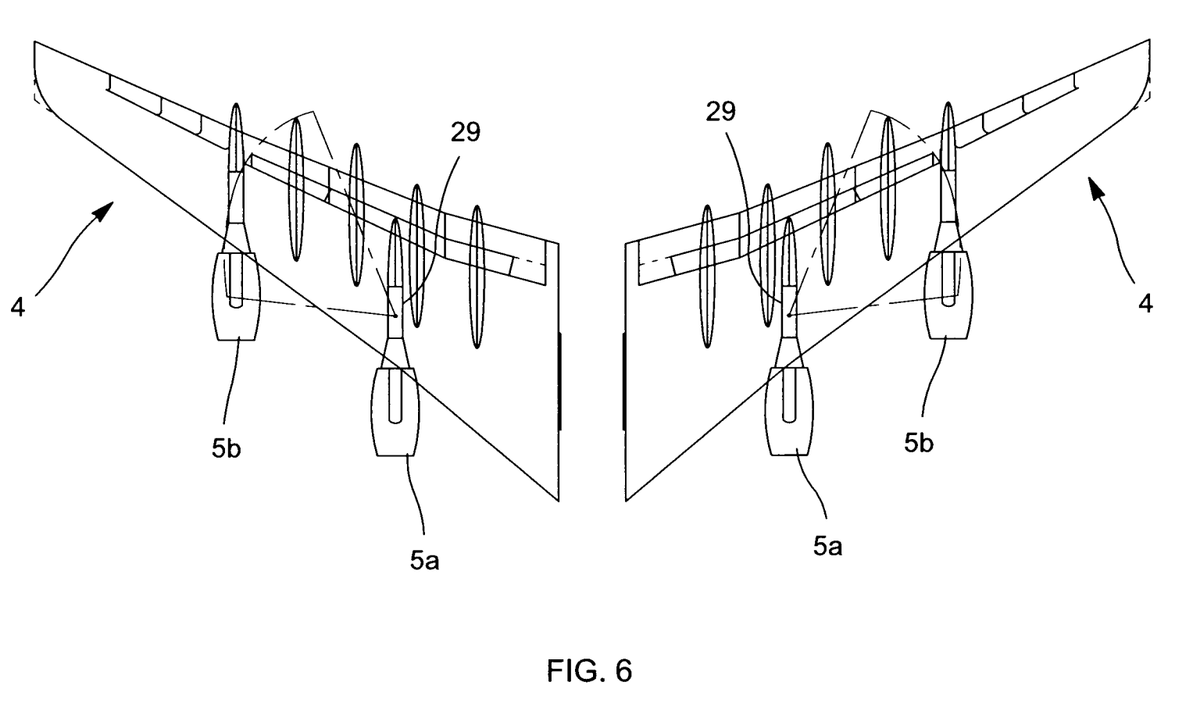
FIG. 6 diagrammatically shows a top view of the wing assembly of the aircraft, to which the visual observation means are fixed according to one embodiment of the invention.

In one embodiment of the invention, visual monitoring means 29 are provided to observe liquid injection through the injection means 23 and therefore the formation of smoke 2, as shown in FIG. 6. The visual monitoring means 29 may be cameras 29, connected to the control box 28 so as to modify operation of the device according to the invention as a function of visual information provided by the cameras 29. The position of the cameras is adapted to the type of aircraft. For an aircraft 1 comprising two pairs of turbojets 5 (an inboard pair 5A consisting of the engines 5 closest to the fuselage 3 and an outboard pair 5*b* consisting of the engines 5 furthest from the fuselage 3), the device according to the invention preferably cooperating with the outboard engines 5*b*, the cameras 29 may be fixed to the mounting pylons 15 of the inboard engines 5*a* and directed towards the injection means 23 fixed to the aft fairings 16 of the outboard engines 5*b*. In the case of an aircraft 1 with only one pair of turbojets 5, the cameras 29 may be fixed to the fuselage 3 or to the central fairing connecting the two wings 4*a* and 4*b*, and directed so as to display the injection means 23.

When using the device according to the invention for the first time, the device will have to be primed. Firstly, the liquid inlet solenoid valve EV1 must be open, together with the manual liquid inlet valve V1. The liquid outlet solenoid valve EV2 is then closed and the third solenoid valve EV3 is open so as to create liquid circulation inside the distribution means 7. The manual priming valve V3 is then opened progressively until liquid starts to exit through pipe S2. When liquid exits, it is considered that the device according to the invention is primed.

During normal operation of the device according to the invention, the third solenoid valve EV3 and the manual priming valve V3 are closed and the outlet solenoid valve EV2 and the manual outlet valve V2 are open. Control means 8 are used to control the speed of the motors M1 and M2, controlling the pump P and the liquid flow through the flow regulator RD. The device according to the invention may be controlled throughout the tests. It may be switched off and ignited during the flight, and the flow may be modified depending on the required objectives during the tests.

The conveyance means 9 will have to be drained at the end of the tests while the turbojets 5 are still in operation, to prevent any liquid from remaining in the pipes 9a, 9b, 9c and 9d. To achieve this, motors M1 and M2 controlling the pump P are switched off, the liquid inlet solenoid valve EV1 and outlet solenoid valve EV2 are closed, and the associated manual valves V1 and V2 are also closed. The gas inlet valve V4 is then open to allow gas under pressure to enter into the conveyance means 9. The liquid remaining in the conveyance means 9 is then ejected through the injection means 23 and generates the smoke 2. Draining is terminated when no more smoke 2 is generated. The gas inlet valve V4 is then closed again, and the device is ready for use another time.

Obviously, those skilled in the art could make various modifications to the aircraft and the smoke generation device that have been described above as non-limitative examples.

The invention claimed is:

1. An aircraft comprising a smoke generation device comprising at least one turbojet propelling the aircraft, the turbojet having a hot gas flow zone, the device comprising:
    a tank containing a smoke generating liquid;
    a liquid distributing unit configured to distribute the liquid connected to the tank;
    a liquid conveyor including a first pipe connected to the liquid distribution unit and located inside a fuselage of the aircraft, and a second pipe located inside a wing assembly of said aircraft and connected to the first pipe;
    an injector connected to the liquid distribution unit through the liquid conveyor and configured to inject the liquid into a hot gas flow in the hot gas flow zone, the hot gas flow generated by the fuel burned by the at least one turbojet, said smoke generating liquid being separate from fuel burned by the at least one turbojet to generate thrust such that the tank, the liquid distributing unit, the liquid conveyor, and the injector are not in flow communication with a fuel distribution system supplying fuel to the at least one turbojet; and
    a controller located inside the fuselage of the aircraft and configured to control said liquid distribution unit, wherein said tank and said liquid distribution unit are arranged inside the fuselage of the aircraft and said liquid distribution unit includes a liquid flow regulator,
    wherein the injector is oriented so that the liquid is injected into the turbojet hot gas flow, and
    wherein the turbojet is supported by a mounting pylon attached to the wing of the aircraft and fitted with an aft fairing adjacent to the zone of the hot gas flow of the turbojet, the injector is connected to a part of the liquid conveyor fixed to the aft fairing of the mounting pylon.

2. The aircraft according to claim 1, wherein the injector is configured to spray the liquid.

3. The aircraft according to claim 1, wherein the injector includes a plurality of injectors each of which can be closed by a closing unit.

4. The aircraft according to claim 1, wherein the liquid distribution unit includes a liquid purging unit configured to purge the liquid present in said liquid conveyor.

5. The aircraft according to claim 1, further comprising:
    a visual observation unit configured to monitor the injector and connected to the controller.

6. The aircraft according to claim 1, wherein said tank, said liquid distribution unit, and said controller are all part of a removable assembly.

7. The aircraft according to claim 1, wherein the liquid conveyor connecting said liquid distribution unit to said injector is part of a non-removable assembly.

8. The aircraft according to claim 1, wherein the smoke generating liquid is oil.

9. A method for visualizing aircraft wake vortices of the aircraft including the smoke generation device according to claim 1, the method comprising:
    distributing the smoke generating liquid from the tank into the first pipe;
    distributing the smoke generating liquid from the first pipe into the second pipe;
    generating the smoke by injecting the liquid from the second pipe into the hot gas flow in the hot gas flow zone; and
    visualizing wake vortices crossing the generated smoke.

10. The method for visualizing aircraft wake vortices according to claim 9, wherein injecting includes spraying the liquid into the hot gas flow using an injector.

11. The method for visualizing aircraft wake vortices according to claim 9, wherein injecting includes spraying oil into the hot gas flow.

12. The method for visualizing aircraft wake vortices according to claim 9, further comprising:
    controlling the injecting the liquid using the controller.

13. The method for visualizing aircraft wake vortices according to claim 9, further comprising:
    purging the liquid present in said liquid conveyor.

14. An aircraft comprising a smoke generation device comprising at least one turbojet propelling the aircraft, the turbojet having a hot gas flow zone, the device comprising:
    a tank containing a smoke generating liquid;
    a liquid distributing unit configured to distribute the liquid connected to the tank;
    a liquid conveyor including a first pipe connected to the liquid distribution unit and located inside a cabin of a fuselage of the aircraft, and a second pipe located inside a wing assembly of said aircraft and connected to the first pipe;
    an injector connected to the liquid distribution unit through the liquid conveyor and configured to inject the liquid into a hot gas flow in the hot gas flow zone, the hot gas flow generated by the fuel burned by the at least one turbojet, said smoke generating liquid being separate from fuel burned by the at least one turbojet to generate thrust such that the tank, the liquid distributing unit, the liquid conveyor, and the injector are not in flow communication with a fuel distribution system supplying fuel to the at least one turbojet; and
    a controller located inside the cabin of the fuselage of the aircraft and configured to control said liquid distribution unit, wherein said tank and said liquid distribution unit are arranged inside the cabin of the fuselage of the aircraft and said liquid distribution unit includes a liquid flow regulator,
    wherein the injector is oriented so that the liquid is injected into the turbojet hot gas flow, and
    wherein the turbojet is supported by a mounting pylon attached to the wing of the aircraft and fitted with an aft fairing adjacent to the zone of the hot gas flow of the turbojet, the injector is connected to a part of the liquid conveyor fixed to the aft fairing of the mounting pylon.

15. An aircraft comprising a smoke generation device comprising at least one turbojet propelling the aircraft, the turbojet having a hot gas flow zone, the device comprising:

a tank containing a smoke generating liquid;
a liquid distributing unit configured to distribute the liquid connected to the tank;
a liquid conveyor including a first pipe connected to the liquid distribution unit and located inside a hold of a fuselage of the aircraft, and a second pipe located inside a wing assembly of said aircraft and connected to the first pipe;
an injector connected to the liquid distribution unit through the liquid conveyor and configured to inject the liquid into a hot gas flow in the hot gas flow zone, the hot gas flow generated by the fuel burned by the at least one turbojet, said smoke generating liquid being separate from fuel burned by the at least one turbojet to generate thrust such that the tank, the liquid distributing unit, the liquid conveyor, and the injector are not in flow communication with a fuel distribution system supplying fuel to the at least one turbojet; and
a controller located inside the hold of the fuselage of the aircraft and configured to control said liquid distribution unit, wherein said tank and said liquid distribution unit are arranged inside the hold of the fuselage of the aircraft and said liquid distribution unit includes a liquid flow regulator,
wherein the injector is oriented so that the liquid is injected into the turbojet hot gas flow, and
wherein the turbojet is supported by a mounting pylon attached to the wing of the aircraft and fitted with an aft fairing adjacent to the zone of the hot gas flow of the turbojet, the injector is connected to a part of the liquid conveyor fixed to the aft fairing of the mounting pylon.

* * * * *